(12) United States Patent
Whan

(10) Patent No.: US 10,042,063 B2
(45) Date of Patent: Aug. 7, 2018

(54) METHOD AND APPARATUS OF GENERATING SHEAR WAVES FOR SEISMIC EXPLORATION

(71) Applicant: Wen J Whan, West Covina, CA (US)

(72) Inventor: Wen J Whan, West Covina, CA (US)

( * ) Notice: Subject to any disclaimer, the term of this patent is extended or adjusted under 35 U.S.C. 154(b) by 0 days.

(21) Appl. No.: 15/441,773

(22) Filed: Feb. 24, 2017

(65) Prior Publication Data

US 2017/0242138 A1 Aug. 24, 2017

Related U.S. Application Data

(60) Provisional application No. 62/299,376, filed on Feb. 24, 2016.

(51) Int. Cl.
*G01V 1/053* (2006.01)
*E02D 5/02* (2006.01)
*E02D 5/28* (2006.01)
*G01V 1/155* (2006.01)

(52) U.S. Cl.
CPC ............. *G01V 1/053* (2013.01); *E02D 5/02* (2013.01); *E02D 5/28* (2013.01); *G01V 1/155* (2013.01)

(58) Field of Classification Search
CPC ........ G01V 1/053; G01V 1/155; G01V 1/284; G01V 1/047; G01V 1/0475; E02D 5/02; E02D 5/28
USPC ............................................ 367/75; 181/401
See application file for complete search history.

(56) References Cited

U.S. PATENT DOCUMENTS

| | | | |
|---|---|---|---|
| 3,159,232 A | 12/1964 | Fair | |
| 4,135,599 A | 1/1979 | Fair | |
| 4,301,888 A | 11/1981 | Gibson et al. | |
| 4,310,066 A | 1/1982 | Won | |
| 4,388,981 A | 6/1983 | Fair | |
| 4,709,362 A | 11/1987 | Cole | |
| 4,735,280 A | 4/1988 | Cole | |
| 4,771,858 A | 9/1988 | Goodloe | |
| 4,867,096 A | 9/1989 | Cole | |
| 4,922,472 A | 5/1990 | Cole et al. | |
| 5,483,026 A | 1/1996 | Hasbrouck et al. | |
| 5,610,875 A | 3/1997 | Gaiser | |
| 5,800,078 A * | 9/1998 | Tommeraasen | E04H 9/02 405/302.5 |
| 6,065,562 A | 5/2000 | Bird et al. | |
| 6,119,804 A | 9/2000 | Owen | |
| 6,443,664 B1 * | 9/2002 | Horan | E02D 5/08 405/278 |
| 7,650,962 B2 | 1/2010 | Quinn et al. | |

* cited by examiner

*Primary Examiner* — Daniel L Murphy
(74) *Attorney, Agent, or Firm* — Muncy, Geissler, Olds & Lowe, P.C.

(57) ABSTRACT

An apparatus of confining an earth block to engage with a horizontal vibrator for generating shear dominated seismic source and a method of applying the apparatus are related. An apparatus of confining an earth block to be engaged with at least one vibrator for generating a shear dominated seismic source comprises a plurality of horizontal steels, a plurality of vertical steel sheet piles, a plurality of vertical elongated steel pile sheets, a plurality of horizontal elongated steels, and at least one vibrator.

13 Claims, 6 Drawing Sheets

METHOD AND APPARATUS OF GENERATING SHEAR WAVES FOR SEISMIC EXPLORATION

The present application is a Non-Provisional of U.S. Provisional Patent Application Ser. No. 62/299,376, titled "A Method of Generating Shear Wave for Seismic Exploration," filed on Feb. 24, 2016, by Wen J Whan.

FIELD OF THE INVENTION

The present invention is related to a method and apparatus for generating shear waves for seismic surveys. The apparatus of the present invention uses long metal plates punched vertically onto the surface to be explored. These vertical plates are then fixed to a horizontal rectangle frame to make a firm couple to the earth so that the confined earth media will vibrate as a unity. Dedicated vertical and horizontal steels are elongated so that they could be engaged with horizontal vibrator sources to generate shear waves of different directions and phases. The vibrators would be located at some distance (X) away from the metal box horizontally or vertically. The magnitude of the seismic waves generated would be proportional to the distance (X). The confined earth block could be expanded by punching additional vertical or tilted steel sheet piles onto the ground and tightening them to the original frame to give additional coupling to the earth.

BACKGROUND OF THE INVENTION

There are patents related to shear wave generation apparatus and method. The U.S. Pat. No. 3,159,232 by D. W. Fair in 1964, the U.S. Pat. No. 4,135,599 by Delbert W. Fair, 1977 and the U.S. Pat. No. 4,388,981 by Delbert W. Fair in 1983 all disclosed a shear wave generator by using pyramidal bodies connected to a horizontal plate to couple the earth surface. The horizontal vibrator is located on top of the plate to generate the shear wave. The U.S. Pat. No. 4,301,888 by James Gibson in 1981 disclosed an impulse shear wave generator using a pair of guillotinized, separately activated hammer/anvil sub-assemblies. The U.S. Pat. No. 4,310,066 by Ihn J. Won in 1982 disclosed a torsional shear wave generator using a hollow elongated shaft having a plurality of circumferentially spaced vanes and a loading arm that secured to the top portion of the shaft and extends perpendicular to the shaft. The U.S. Pat. No. 4,735,280 by Jack H. Cole in 1987 disclosed a shear wave generator by using a truck mounter horizontal vibrator and the telescoping blade to couple the energy into the earth medium. The U.S. Pat. No. 4,709,362 by Hack H. Cole in 1987 disclosed an orbital vibrator. An annular reaction mass is mounted on a crank by means of bearing. The reaction mass orbitally oscillates relative to the axis of the crank shaft without rotation. The U.S. Pat. No. 4,771,858 by Kent J. Goodloe in 1988 disclosed a shear wave generator which isolates the energy generated by shear wave seismic vibrator from their transport vehicles. The U.S. Pat. No. 4,867,096 by Jack H. Cole in 1989 disclosed a shear wave generator consists of a conical lower end tube and a horizontal vibrator. U.S. Pat. No. 4,922,472 by Jack H. Cole in 1990 disclosed an apparatus for inducing elliptically polarized shear wave by using two shear wave vibrators engaged to the earth medium in cross-polarized attitude and driven at sweep rated having variable phase displacement. The U.S. Pat. No. 5,483,026 by Wilfred P. Hasbrouck, etc. in 1996 disclosed a rotary seismic shear wave source utilizing a heavy flywheel positioned for rotation in a vertical plane to generate and store energy which is then transferred to the ground.

More recently, the U.S. Pat. No. 5,610,875 by James E. Gaiser in 1997 disclosed an exploration method by using a compressional-wave source to produce converted shear waves which are subjected to Alford 4-components rotation to align the observation coordinates with the natural coordinates of the principal anisotropic axes of a birefringent formation. The U.S. Pat. No. 6,065,562 by James M. Bird, etc. in 2000 disclosed a seismic vibrator system for imparting compressional and shear wave vibrations into the earth uses an earth contacting base with a vertical post. The U.S. Pat. No. 6,119,804 by Thomas E. Owen in 2000 disclosed a horizontally polarized shear wave vibrator by using a frame with its base plates coupled with the earth by ground screws. The horizontal drivers are located inside the frame. U.S. 7,650,962 B2 by Mark K. Quinn in 2010 disclosed a shear wave generator by an offset mass rotating in a plane perpendicular to the surface of the ground, which impacts an impact member coupled to the ground.

None of the Patents mentioned has disclosed the means to vibrate an expandable confined body inside a media to create shear waves of different directions.

SUMMARY OF THE INVENTION

In one aspect of the present invention, it discloses a method and apparatus for creating shear waves by vibrating a confined block in the surface of the media.

In another aspect of the present invention, it discloses a method and apparatus for creating different shear waves by vibrating the frames confining the media bock from different direction.

Moreover, the present invention discloses a method and apparatus of magnifying the shear waves by vibrating metal bar with a horizontal vibrator source located at some distance (X) away from the metal box horizontally or vertically in order to create different shear waves. The magnitude of the vibration generated would be proportional to the distance (X).

In order to achieve the objects, the present invention provides an apparatus of steel frame confining an earth block to be engaged with at least one vibrator for generating a shear dominated seismic source, comprises a plurality of horizontal steels, a plurality of vertical steel sheet piles, a plurality of vertical elongated steel pile sheets, a plurality of horizontal elongated steels, and at least one vibrator. The plurality of horizontal steels is placed on a ground to confine an earth block of the ground. Each vertical steel sheet pile is fixed to the steel frame and has one end punched into the ground to confine the earth block and another end extended upward from the steel frame. Each vertical elongated steel pile sheet has one end punched into the ground. The plurality of horizontal elongated steels is extended from the steel frame. The at least one vibrator is engaged with at least one of the plurality of horizontal elongated steels extended from the steel frame or the plurality of vertical elongated steel sheet piles, for generating shear waves to vibrate the earth block.

In implementation, the at least one vibrator includes at least one horizontal vibrator or multiple synchronized vibrators for generating shear waves in horizontal directions.

In implementation, the horizontal steels for confining the earth block includes H steels and connected firmly with the plurality of vertical steel sheet piles.

In implementation, the horizontal steels, the vertical steel pile sheets, the horizontal elongated steels, and the vertical elongated steel sheet piles are connected together by using screws and guide grooves.

In implementation, at least two of the plurality of horizontal elongated steels or the plurality of vertical elongated steel sheet piles are engaged with horizontal vibrators from two opposite directions to create shear waves of opposite phase with respect to each other.

In implementation, the at least two of the plurality of horizontal elongated steels and the plurality of vertical elongated steel sheet piles engaged with the horizontal vibrators are of different lengths, so as to produce magnifying effect on the vibration of the confined earth block.

In implementation, the apparatus further comprises additional vertical steel sheet piles, additional vertical elongated steel sheet piles, additional horizontal steels, and additional horizontal elongated steels, where each steel sheet pile is perpendicular or tilted to the horizontal steel frame or horizontal elongated steels, and has one end punched into the ground and another end tightened to the horizontal steels, the additional horizontal steels, and the additional horizontal elongated steels, so as to expand the size of the confined earth block and to provide additional coupling of a bigger confined block to the earth.

The present invention also provides a method of confining an earth block to be engaged with at least one horizontal vibrator for generating shear dominated seismic source, comprising steps of:

A1: providing a steel frame with horizontal steels, horizontal elongated steels, vertical steel sheet piles, and vertical elongated steel sheet piles to confine an earth block of a ground, where the horizontal steels and the horizontal elongated steels are placed on the ground, and each vertical steel sheet pile is fixed to the horizontal steels and has one end punched into the ground to confine the earth block and another end extended upward from the steel frame, and each horizontal elongated steel is extended from the steel frame; and A2: engaging at least one of the horizontal elongated steels and the vertical steel sheet piles for generating shear waves to vibrate the earth block.

In implementation, the at least one vibrator in step A2 includes one horizontal vibrator or multiple synchronized vibrators for generating shear waves in horizontal directions.

In implementation, the steel frame for confining the earth block in step A1 includes the plurality of horizontal steels, and the plurality of vertical steel sheet piles are connected together by using screws and guide grooves.

In implementation, step A2 further includes following step:

A20: engaging at least two of the horizontal elongated steels or the vertical elongated steel sheet piles with horizontal vibrators from two opposite directions to create shear waves of opposite phase with respect to each other.

In implementation, the at least two of the horizontal elongated steels or the vertical steel sheet piles engaged with the horizontal vibrators in step A20 are of different lengths, so as to produce magnifying effect on the vibration of the confined earth block.

In implementation, the method further comprising a step A15 between the step A1 and the step A2 as follows:

A15: connecting the steel frame with additional vertical steel sheet piles, additional vertical elongated steel sheet piles, additional horizontal steels, and additional horizontal elongated steels, where each steel sheet pile is perpendicular or tilted to the steel frame, and has one end punched into the ground and another end tightened to the steel frame, so as to expand the size of the confined earth block and to provide additional coupling of a bigger confined block to the earth.

DETAILED DESCRIPTION OF THE PREFERRED EMBODIMENT

Figure 1:
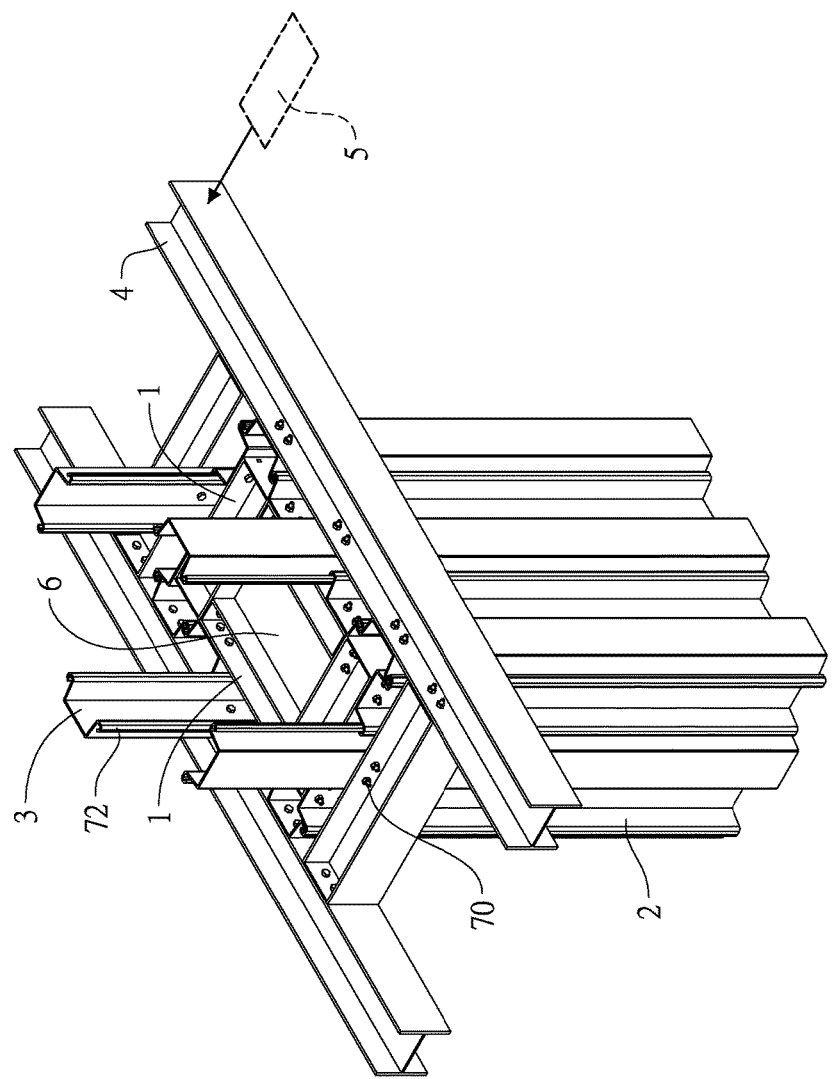
FIG. 1 shows an embodiment of an apparatus of confining an earth block to be engaged with at least one vibrator for generating a shear dominated seismic source according to the present invention. The earth block is confined by punching steel sheet piles into the ground that are fixed to a rectangular metal frame to create a firm unit to vibrate together.

The present invention discloses an apparatus and method for generating shear waves for seismic surveys, where the shear waves are generated by vibrating an earth media block confined by a metal frame and steel sheet piles. The apparatus and method could be applied especially for locating fracture or velocity anomalies of the survey areas.

In one embodiment, the frame could consist of metal bars or plates welded or screwed together.

In one embodiment, the elongated plates to confine the media consist of a steel sheet pile of certain width with guide groove so that two elongated plates could be hooked with each other when they are placed opposite to each other.

In one embodiment, a horizontal accelerometer is located on the horizontal vibroseis' baseplate to record the vibrating waveform and hence the magnitude of the vibration.

In one embodiment, a three component accelerometer or geophone is located outside the confining box to record the seismic wave right close to it in order for cross correlating the wave recorded at remote sites and also to compare with the waveform recorded from the baseplate to determine the deterioration due to the possible softness of the confined body with respect to its surrounding media.

In one embodiment, additional vertical or tilted steel sheet piles could be punched onto the surface and tightened to the frame to give additional coupling of the confined block, especially after long vibration.

As shown in FIGS. 1~4, the present invention discloses an apparatus in a form of steel frame confining an earth block 6 to be engaged with at least one vibrator 5 for generating a shear dominated seismic source. The apparatus comprises a plurality of horizontal steels 1, a plurality of vertical steel sheet piles 2, a plurality of vertical elongated steel pile sheets 3, a plurality of horizontal elongated steels 4, and at least one vibrator 5.

The plurality of horizontal steels 1 is placed on a ground to confine an earth block 6 of the ground. Each vertical steel sheet pile 2 has one end punched into the ground to confine the earth block and another end connected to the horizontal steels 1. Each vertical elongated steel pile sheets 3 has one end punched into the ground and another end extended above the horizontal steels 1. The plurality of horizontal elongated steels 4 is extended from the horizontal steels 1. The at least one vibrator 5 is engaged with at least one of the plurality of horizontal elongated steels 4 or the plurality of vertical elongated steel sheet piles 3, for generating shear waves to vibrate the earth block.

In this embodiment, the horizontal steels for confining the earth block include H steels and are connected firmly with the plurality of vertical steel sheet piles. Specifically, referring to FIG. 1 and 2, the horizontal steels 1, the vertical steel pile sheets 4, the horizontal elongated steels 4, and the vertical elongated steel sheet piles 3 are connected together by using screws 70 and guide grooves 72.

FIG. 1 describes the earth media which is confined by steel sheet piles punched into the ground, which are then secure to a rectangular metal frame to create a firm unit to vibrate together as a solid unit.

As illustrated in FIG. 1, the apparatus comprises at least a steel frame, a plurality of vertical steel sheet piles, steel sheet piles to confine a block of media, plurality of elongated steel piles and a vibrator or synchronized multiple vibrators. The steel sheet piles could be elongated vertically or horizontally, wherein the vibrator could be relocated and engage with different elongated steel sheet pile to create shear wave of different directions and phases.

Figure 5:
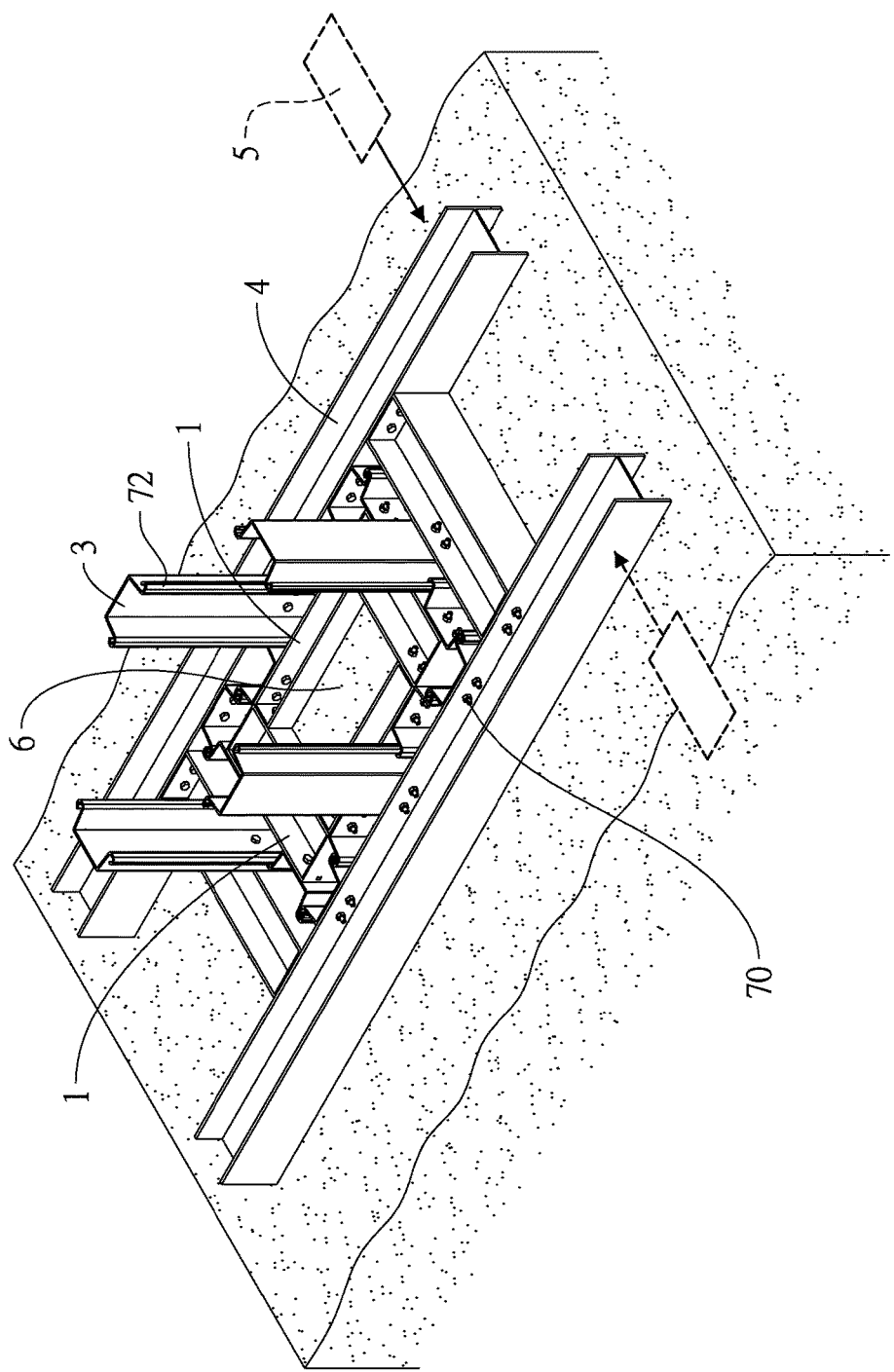
FIG. 5 shows that elongated steel sheet piles are engaged with vibrators from different directions.

In implementation, the at least one vibrator includes at least one horizontal vibrator or multiple synchronized vibrators for generating shear waves in horizontal directions. Preferably, at least two of the plurality of horizontal elongated steels or the plurality of vertical elongated steel sheet piles are engaged with horizontal vibrators from two opposite directions to create shear waves of opposite phase with respect to each other. For example, FIG. 5 describes creating shear waves which are 180 degrees out of phase to each other by engaging the vibrator with the elongate steel from the opposite directions.

In another embodiment, the at least two of the plurality of horizontal elongated steels and the plurality of vertical elongated steel sheet piles engaged with the horizontal vibrators are of different lengths, so as to produce magnifying effect on the vibration of the confined earth block.

The vibrator or multiple synchronized vibrators hit the elongated steels in the horizontal direction to create shear dominated seismic wave. In one embodiment, the vibrators could be relocated in order to hit the elongated steel in the opposite direction to create opposite shear wave.

Figure 2:
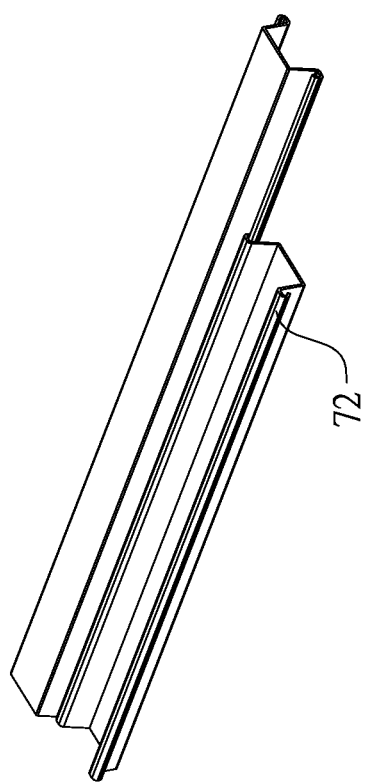
FIG. 2 shows the vertical steel sheet piles are slidable with each other via a guide groove, so that the plates of the two steel piles that are adjacent to each other could be hooked together.
Figure 3:
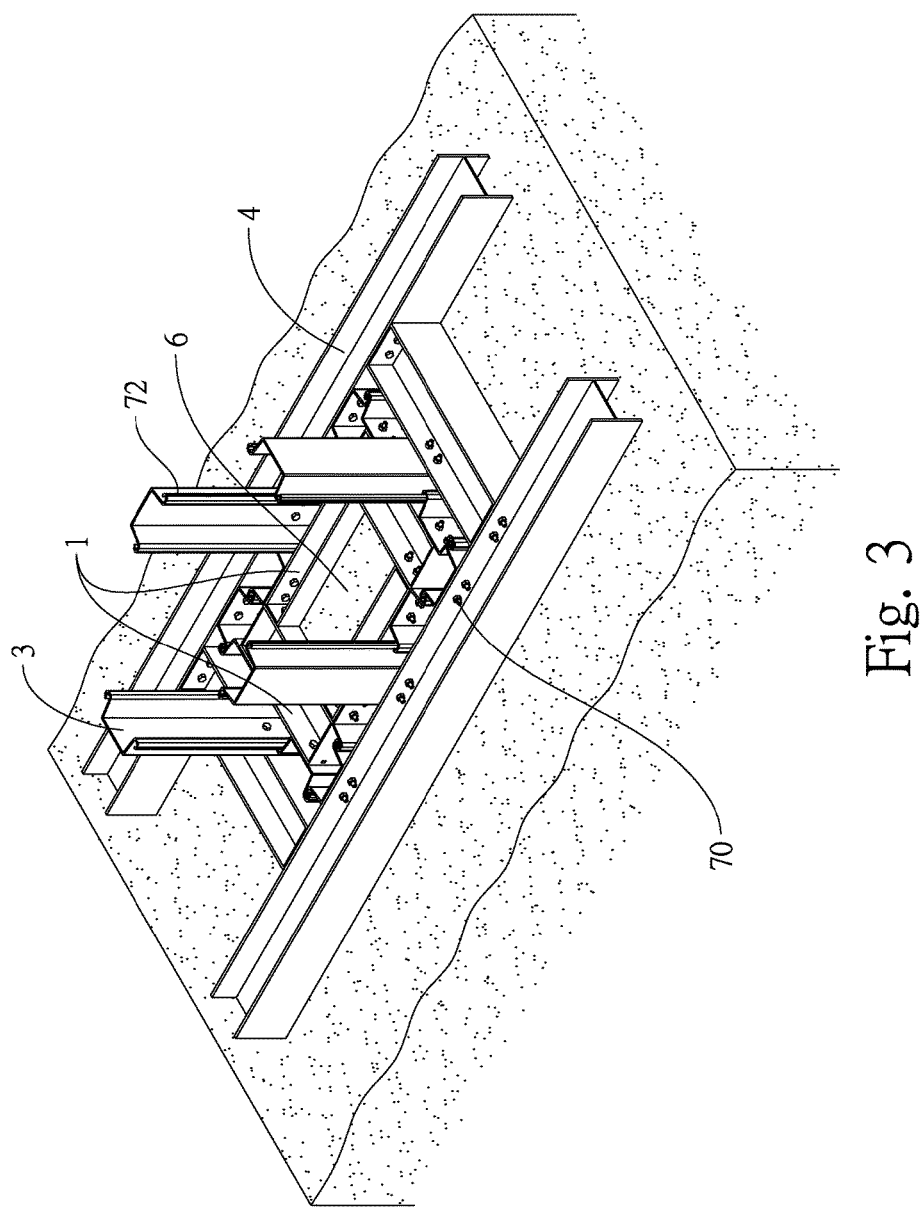
FIG. 3 shows that the rectangular metal frame is built by H type steels and further secured by steel bars.
Figure 4:
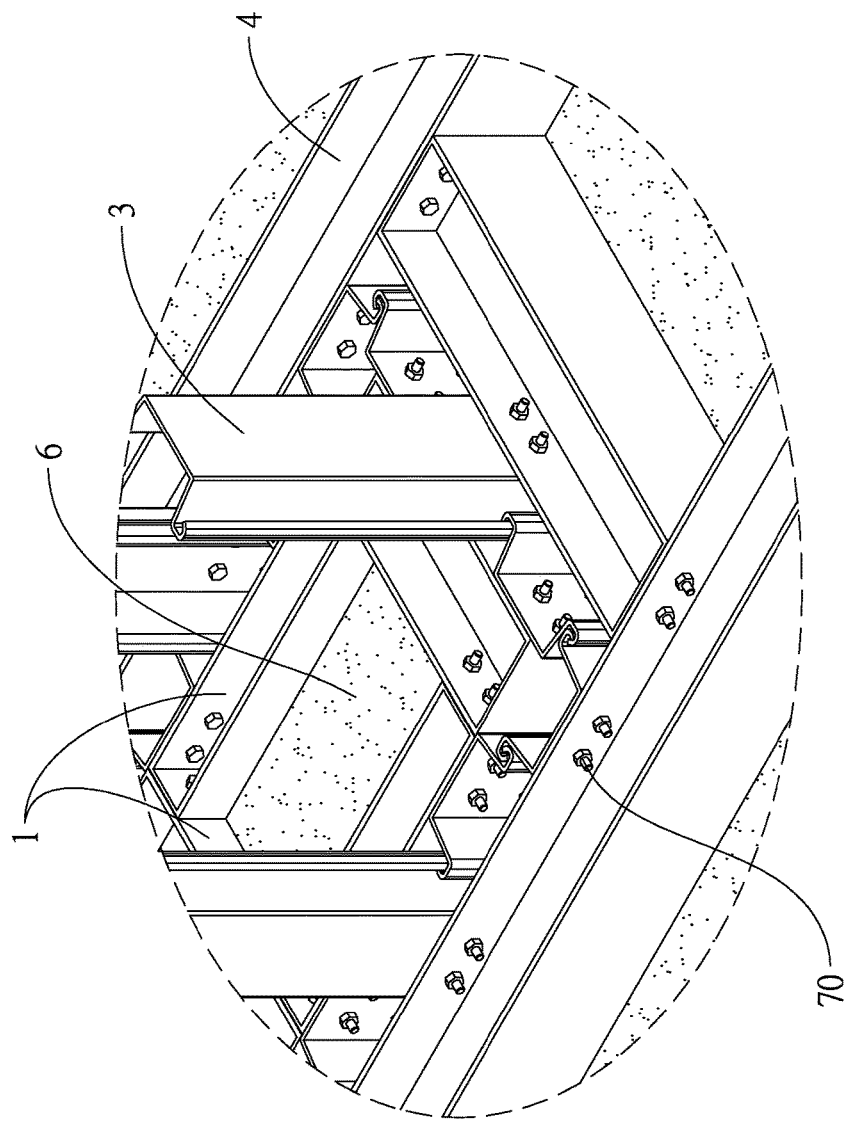
FIG. 4 shows that steel sheet piles are further fixed to the metal frame by heavy screw drivers.

FIG. 2 shows the vertical steel sheet piles, which are widely used in the civil basement construction are slide in each other via a guide groove 72 so that the plates adjacent to each other could be hooked together. FIG. 3 describes the steel sheet piles are secured with the rectangular metal frame, which is built by H type steel and further secured by steel bars. FIG. 4 describes steel sheet piles are further fixed to the frame by heavy screw drivers.

Figure 6:
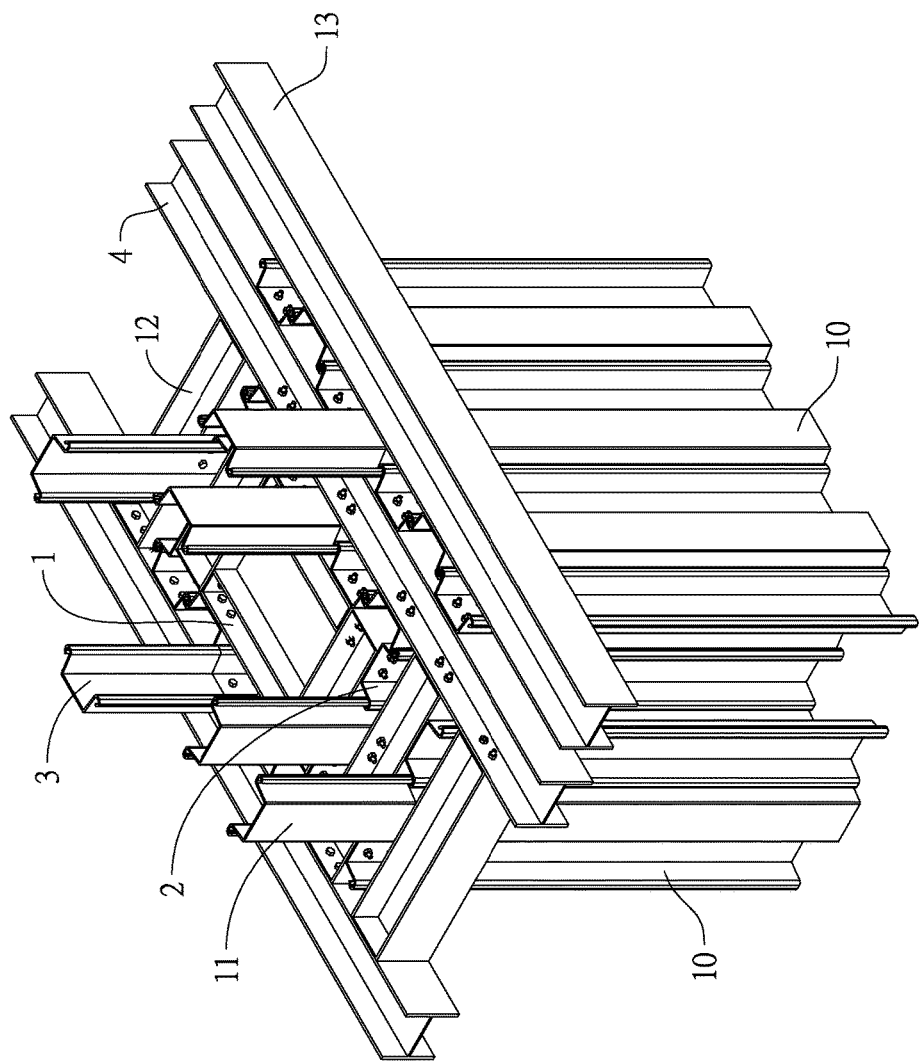
FIG. 6 shows that additional vertical or tilted steel sheet piles are punched onto the ground and tightened to the metal frame to give additional coupling of the expanded confined earth block.

Referring to FIG. 6, another embodiment of the present invention is shown. FIG. 6 describes expanding the confined earth block by additional vertical or tilted steel sheet piles punched onto the ground and tightened to the original steel frame to give additional coupling of the confined block. In this embodiment, the apparatus further comprises additional vertical steel sheet piles 10, additional vertical elongated steel sheet pile 11, additional horizontal steel 12, and additional horizontal elongated steel 13. Each steel sheet pile is perpendicular or tilted to the horizontal steels 1 or horizontal elongated steels 4, and has one end punched into the ground and another end tightened to the original horizontal steels, the additional horizontal steel 12 and the additional horizontal elongated steel 13, so as to expand the size of the confined earth block 6 and to provide additional coupling of a bigger confined block to the earth.

The present invention also provides a method of confining an earth block to be engaged with at least one horizontal vibrator for generating shear dominated seismic source, comprising steps of:

A1: providing a steel frame with horizontal steels, horizontal elongated steels, vertical steel sheet piles, and vertical elongated steel sheet piles to confine an earth block of a ground, where the horizontal steels and the horizontal elongated steels are placed on the ground, and each vertical steel sheet pile is fixed to the horizontal steels and has one end punched into the ground to confine the earth block and another end extended upward from the steel frame, and each horizontal elongated steel is extended from the steel frame; and A2: engaging at least one of the horizontal elongated steels and the vertical steel sheet piles for generating shear waves to vibrate the earth block.

In implementation, the at least one vibrator in step A2 includes one horizontal vibrator or multiple synchronized vibrators for generating shear waves in horizontal directions.

In implementation, the steel frame for confining the earth block in step A1 includes the plurality of horizontal steels, and the plurality of vertical steel sheet piles are connected together by using screws and guide grooves.

In implementation, step A2 further includes following step:

A20: engaging at least two of the horizontal elongated steels or the vertical elongated steel sheet piles with horizontal vibrators from two opposite directions to create shear waves of opposite phase with respect to each other.

In implementation, the at least two of the horizontal elongated steels or the vertical steel sheet piles engaged with the horizontal vibrators in step A20 are of different lengths, so as to produce magnifying effect on the vibration of the confined earth block.

In implementation, the method further comprising a step A15 between the step A1 and the step A2 as follows:

A15: connecting the steel frame with additional vertical steel sheet piles, additional vertical elongated steel sheet piles, additional horizontal steels, and additional horizontal elongated steels, where each steel sheet pile is perpendicular or tilted to the steel frame, and has one end punched into the ground and another end tightened to the steel frame, so as to expand the size of the confined earth block and to provide additional coupling of a bigger confined block to the earth.

Changes may be made in the above method and apparatus without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present system and method, which, as a matter of language, might be said to fall therebetween.

What is claimed is:

1. An apparatus of steel frame confining an earth block to be engaged with at least one vibrator for generating a shear dominated seismic source, comprising:
   a plurality of horizontal steels, placed on a ground to confine an earth block of the ground;
   a plurality of vertical steel sheet piles, each of which is fixed to the steel frame and has one end punched into the ground to confine the earth block and another end extended upward from the steel frame;
   a plurality of vertical elongated steel pile sheets, each of which has one end punched into the ground;
   a plurality of horizontal elongated steels, extended from the steel frame;
   at least one vibrator, engaged with at least one of the plurality of horizontal elongated steels extended from the steel frame or the plurality of vertical elongated steel sheet piles, for generating shear waves to vibrate the earth block.

2. The apparatus as claimed in claim 1, wherein the at least one vibrator includes at least one horizontal vibrator or multiple synchronized vibrators for generating shear waves in horizontal directions.

3. The apparatus as claimed in claim 1, wherein the horizontal steels for confining the earth block includes H steels and connected firmly with the plurality of vertical steel sheet piles.

4. The apparatus as claimed in claim 3, wherein the horizontal steels, the vertical steel pile sheets, the horizontal elongated steels, and the vertical elongated steel sheet piles are connected together by using screws and guide grooves.

5. The apparatus as claimed in claim 1, wherein at least two of the plurality of horizontal elongated steels or the plurality of vertical elongated steel sheet piles are engaged with horizontal vibrators from two opposite directions to create shear waves of opposite phase with respect to each other.

6. The apparatus as claimed in claim 5, wherein the at least two of the plurality of horizontal elongated steels and the plurality of vertical elongated steel sheet piles engaged with the horizontal vibrators are of different lengths, so as to produce magnifying effect on the vibration of the confined earth block.

7. The apparatus as claimed in claim 1, further comprising additional vertical steel sheet piles, additional vertical elongated steel sheet piles, additional horizontal steels, and additional horizontal elongated steels, where each steel sheet pile is perpendicular or tilted to the horizontal steel frame or horizontal elongated steels, and has one end punched into the ground and another end tightened to the horizontal steels, the additional horizontal steels, and the additional horizontal elongated steels, so as to expand the size of the confined earth block and to provide additional coupling of a bigger confined block to the earth.

8. A method of confining an earth block to be engaged with at least one horizontal vibrator for generating shear dominated seismic source, comprising steps of:
   A1: providing a steel frame with horizontal steels, horizontal elongated steels, vertical steel sheet piles, and vertical elongated steel sheet piles to confine an earth block of a ground, where the horizontal steels and the horizontal elongated steels are placed on the ground, and each vertical steel sheet pile is fixed to the horizontal steels and has one end punched into the ground to confine the earth block and another end extended upward from the steel frame, and each horizontal elongated steel is extended from the steel frame; and
   A2: engaging at least one of the horizontal elongated steels and the vertical steel sheet piles for generating shear waves to vibrate the earth block.

9. The method as claimed in claim 8, wherein the at least one vibrator in step A2 includes one horizontal vibrator or multiple synchronized vibrators for generating shear waves in horizontal directions.

10. The method as claimed in claim 8, wherein the steel frame for confining the earth block in step A1 includes the plurality of horizontal steels, and the plurality of vertical steel sheet piles are connected together by using screws and guide grooves.

11. The method as claimed in claim 8, wherein step A2 further includes following step:
    A20: engaging at least two of the horizontal elongated steels or the vertical elongated steel sheet piles with horizontal vibrators from two opposite directions to create shear waves of opposite phase with respect to each other.

12. The method as claimed in claim 11, wherein the at least two of the horizontal elongated steels or the vertical steel sheet piles engaged with the horizontal vibrators in step A20 are of different lengths, so as to produce magnifying effect on the vibration of the confined earth block.

13. The method as claimed in claim 8, further comprising a step A15 between the step A1 and the step A2 as follows:
    A15: connecting the steel frame with additional vertical steel sheet piles, additional vertical elongated steel sheet piles, additional horizontal steels, and additional horizontal elongated steels, where each steel sheet pile is perpendicular or tilted to the steel frame, and has one end punched into the ground and another end tightened to the steel frame, so as to expand the size of the confined earth block and to provide additional coupling of a bigger confined block to the earth.

* * * * *